(12) United States Patent
Jacobsen

(10) Patent No.: US 7,024,793 B2
(45) Date of Patent: Apr. 11, 2006

(54) CALIPER

(75) Inventor: Hans Jacobsen, Täby (SE)

(73) Assignee: Haglöf Sweden AB, Långsele (SE)

( * ) Notice: Subject to any disclaimer, the term of this patent is extended or adjusted under 35 U.S.C. 154(b) by 0 days.

(21) Appl. No.: 10/490,076

(22) PCT Filed: Sep. 13, 2002

(86) PCT No.: PCT/SE02/01649

§ 371 (c)(1),
(2), (4) Date: Sep. 25, 2004

(87) PCT Pub. No.: WO03/025495

PCT Pub. Date: Mar. 27, 2003

(65) Prior Publication Data

US 2005/0028398 A1    Feb. 10, 2005

(30) Foreign Application Priority Data

Sep. 18, 2001  (SE) .................................... 0103099

(51) Int. Cl.
*G01B 3/20*    (2006.01)

(52) U.S. Cl. ........................................................ 33/784
(58) Field of Classification Search ................. 33/784, 33/783, 787, 788, 793, 521, 703, 705
See application file for complete search history.

(56) References Cited

U.S. PATENT DOCUMENTS

| 4,419,824 | A | * | 12/1983 | Oberhans ..................... 33/784 |
| 4,678,993 | A |   | 7/1987  | Vinnemann et al. ... 324/207.13 |
| 5,029,402 | A | * | 7/1991  | Lazecki et al. ............... 33/784 |
| 5,412,316 | A |   | 5/1995  | Dumais et al. ......... 324/207.13 |
| 5,717,330 | A | * | 2/1998  | Moreau et al. ......... 324/207.13 |
| 5,804,961 | A |   | 9/1998  | Castillo et al. ......... 324/207.13 |
| 5,821,743 | A |   | 10/1998 | Page, Jr. et al. ........ 324/207.13 |
| 6,834,439 | B1| * | 12/2004 | Matsumiya et al. .......... 33/706 |

FOREIGN PATENT DOCUMENTS

EP        0 557 149 A1    8/1993

\* cited by examiner

*Primary Examiner*—Christopher W. Fulton
(74) *Attorney, Agent, or Firm*—Alfred J. Mangels

(57) ABSTRACT

A caliper for measuring tree diameters of trees. A slide having a permanent magnet is movable along a graduated rule, the caliper including a pair of legs, one leg attached to one end of the rule, and another leg attached to the slide. An electronic unit measures the position of the slide along the rule and stores measurement values and other desired data. A wire extends within a longitudinal internal cavity in the rule and co-acts with a piezo crystal adjacent an end of the caliper. The wire is connected to a pulse generator that generates short electric pulses of predetermined duration. The caliper also includes a detector that co-acts with the piezo crystal and with the pulse generator pulses to detect a geometric change in the wire that is sensed by the piezo crystal, which emits an electrical pulse in response to that geometric change.

6 Claims, 3 Drawing Sheets

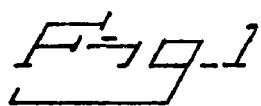
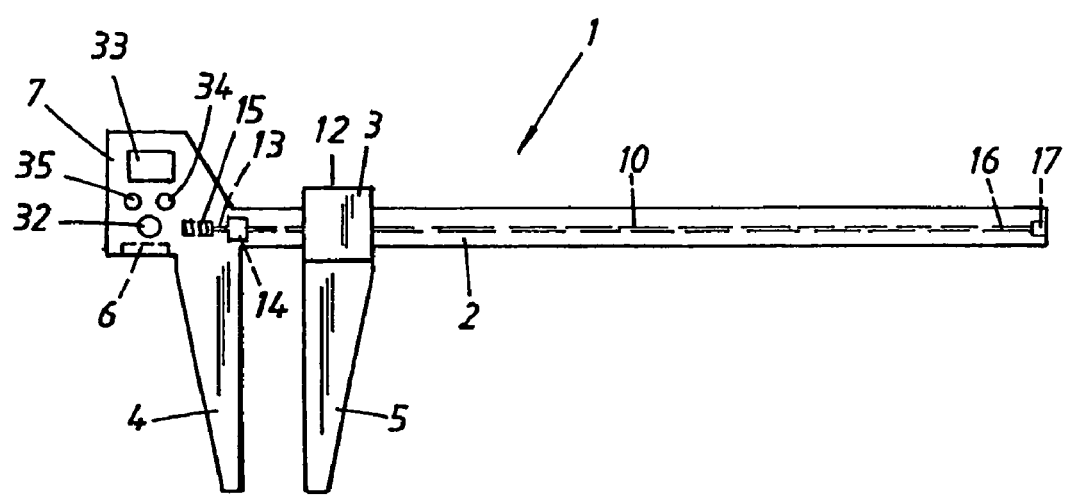
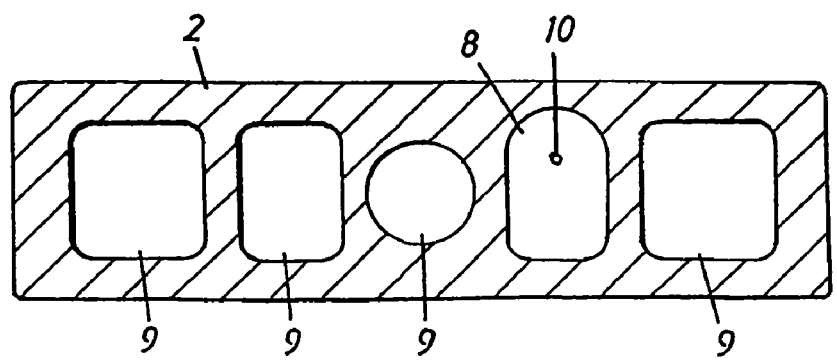

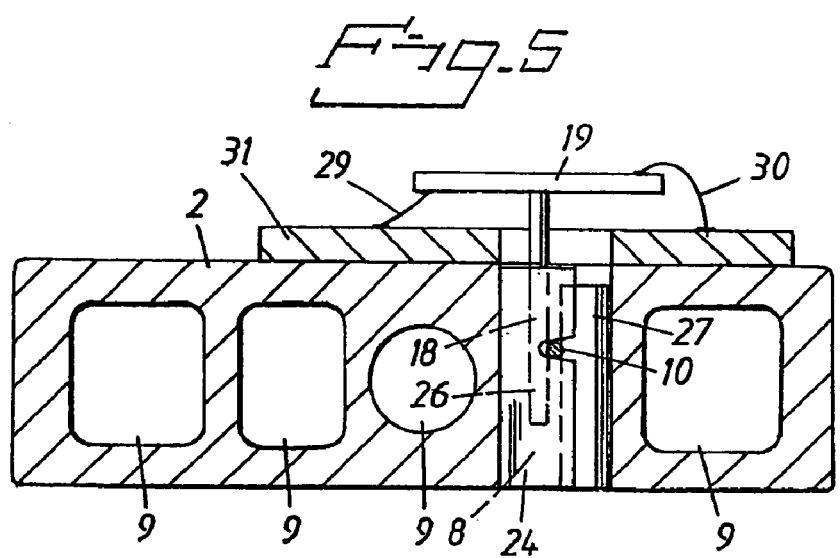
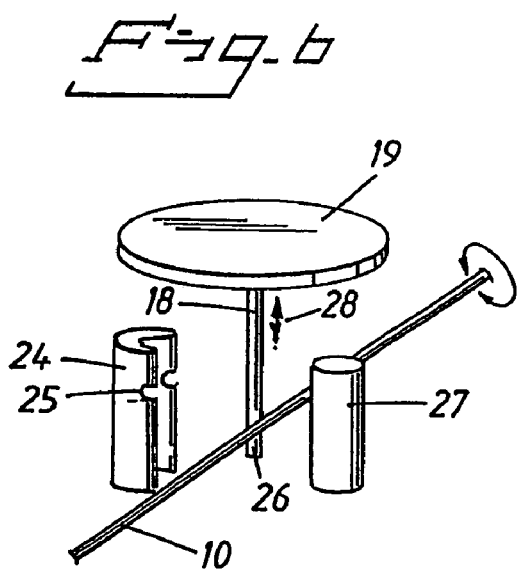
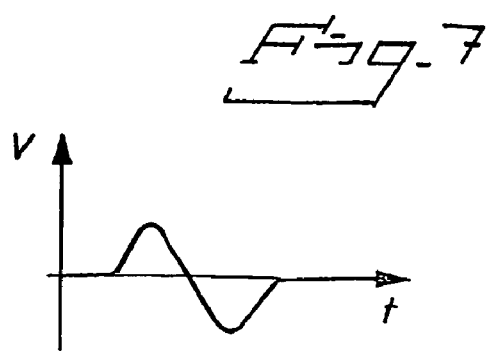

CALIPER

BACKGROUND OF THE INVENTION

1. Field of the Invention

The present invention relates to a caliper of the kind used to measure tree diameters in conjunction with forest inventories.

2. Description of the Related Art

A caliper of that kind includes a fixed scale or graduated rule along which a slide is movable. Provided at one end of the fixed scale and also on the slide are respective legs, wherein measuring is effected between the legs. The measurement is indicated by the position of the slide along the scale or graduated rule. Such calipers are known to the art. Also known to the art are electronic calipers with which said position is indicated electronically and with which the measurement value is presented on a display carried by the slide.

Also known are calipers of that kind that include buttons or keys by means of which the operator can enter data relating to the type of tree concerned, the data being stored in a memory belonging to the caliper, together with actual diameter values.

Such calipers are used in forests under shifting weather conditions. Thus the calipers must be both robust and weather-resistant.

Known calipers have one of two different measuring principles. According to one measuring principle, the graduated rule includes along its length a toothed strip along which a toothed wheel affixed to the slide runs. According to another principle, measuring is effected capacitively between the graduated rule and the slide. That capacitive measuring process is only incremental. It is therefore necessary to first move the slide to a zero position before measuring can take place.

The toothed strip used in accordance with the former principle is easily damaged mechanically. The capacitive principle is sensitive to both moisture and wetness, which can change the capacitance between electrodes on the graduated rule and the slide, respectively.

It is desirable to eliminate those drawbacks.

However, it would be desirable to obtain an electronic caliper that has an absolute measuring function, therewith eliminating the zero setting operation.

The inventive caliper fulfils those desires.

SUMMARY OF THE INVENTION

The present invention thus relates to a caliper of the kind used to measure the diameter of, trees and includes a fixed scale or graduated rule along which a slide can be moved. A leg is attached to one end of the rule and a leg is attached to the slide, respectively and measuring is effected between said legs. An electronic unit is provided for determining the position of the slide along the rule and for storing measurement values and other desired data. The graduated rule has a longitudinally-extending internal cavity and a measuring element that includes an electrically conductive wire extending in said cavity and attached to both ends of said rule. The part of the slide situated at said graduated rule is provided with a permanent magnet. The wire co-acts close to its one end with a piezo crystal, and respective ends of the wire are connected electrically to a pulse generator adapted to generate short electric pulses of predetermined duration. A detector is provided which co-acts with the piezo crystal and which is adapted to detect a geometric change in said wire, wherein the piezo crystal functions to emit an electrical pulse in response to said geometric change.

BRIEF DESCRIPTION OF THE DRAWINGS

The invention will now be described in more detail partly with reference to an exemplifying embodiment of the invention shown in the to the accompanying drawings, in which FIG. 1 is a plan view of a caliper according to the invention;

FIG. 2 is a cross-sectional view of the graduated rule included in the caliper;

FIG. 5 is a cross-sectional view of the graduated rule of the caliper in one position of the piezo crystal;

FIG. 6 is a schematic perspective view of the co-action of a wire with the piezo crystal; and FIG. 7 is a signal diagram.

DESCRIPTION OF THE PREFERRED EMBODIMENTS

Figure 3:
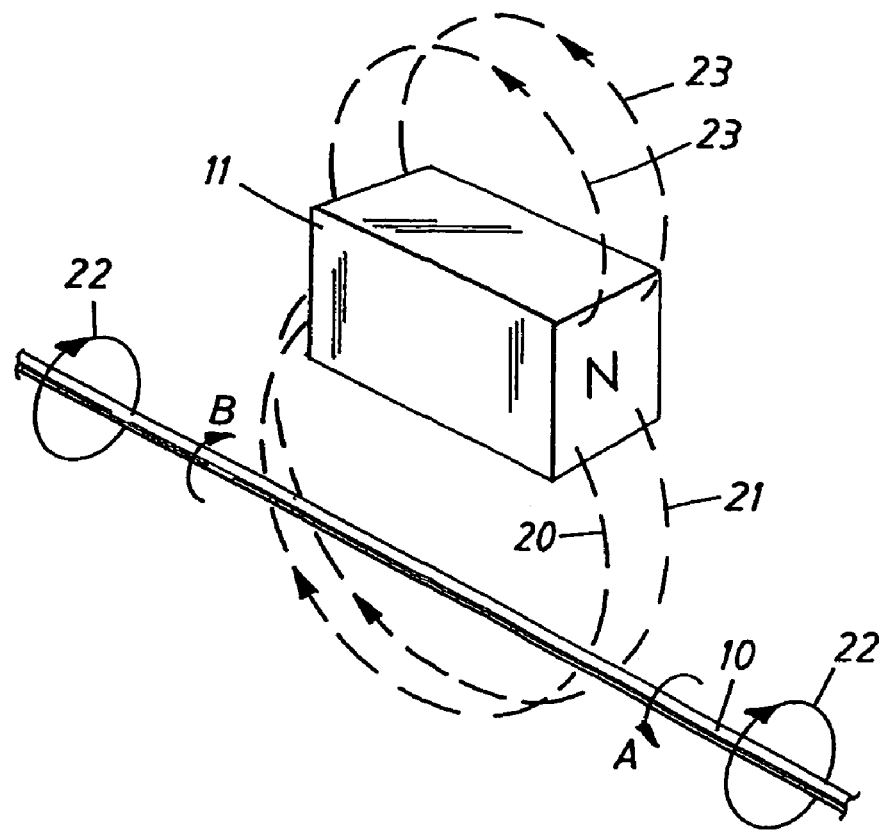
FIGS. 3 and 4 are explanatory sketches.

FIG. 1 illustrates a caliper 1 of the kind used to measure tree diameters. The caliper includes a fixed scale or graduated rule 2 along which a slide 3 is movable. The caliper includes a leg 4 fastened to one end of the rule 2, and a leg 5 fastened to the slide 3. Measuring is effected between those legs. The caliper includes an electronic unit 6, 7 for measuring the position of the slide 3 along the rule 2 and for storing measurement values and other desired data.

The caliper 1 is suitably made of aluminum.

According to the invention, the rule 2 has a longitudinally extending, inner cavity 8, as shown in FIG. 2. The rule may have further longitudinally extending holes 9 in order to give a lower weight. The caliper 1 is provided with a measuring element that includes an electrically conductive wire or filament 10 that extends within said cavity 8.

The wire 10 is fastened to both ends of the rule 2, as indicated in FIG. 1. The wire is fastened at one end 13 by means of a spring 15 so as to keep the wire in tension. The wire is fastened at its other end 16 by means of an appropriate bushing 17. Although not shown, spacing elements formed from electrically insulating material are disposed along the length of the wire in suitable spaced relationship, to prevent the wire from coming into electrical contact with the rule 2 along the length of said wire. The end 16 of said wire 10 is, however, in electrical contact with the rule 2.

As shown in FIG. 3, that part of the slide 3 situated at the rule 2 includes a permanent magnet 11. The permanent magnet 11 may, for instance, be situated at the location to which the reference numeral 12 points in FIG. 1.

The wire 10 co-acts with a piezo crystal 14 that includes the measuring element, close to one end 13 of said wire.

Respective ends 13, 16 of the wire are connected electrically with a pulse generator 6, where the connection of one end 16 of wire 10 is obtained through the rule 2, as mentioned earlier. The pulse generator is adapted to generate short electric pulses of predetermined duration.

Further there is provided a detector 18 (see FIG. 6) which co-acts with the piezo crystal 19 and which is adapted to detect a geometrical change in the wire 10, said piezo crystal 19 functioning to deliver an electrical pulse to said electronic unit 6, 7 in response to said geometrical change.

Figure 4:
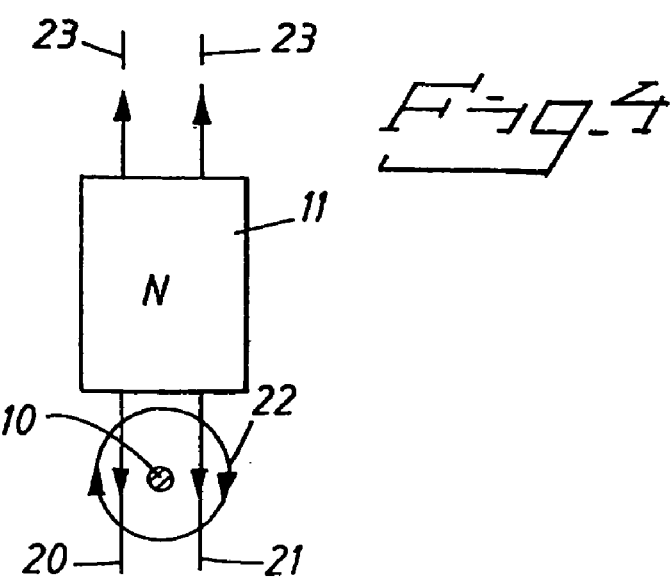

FIGS. 3 and 4 illustrate the measuring principle used in accordance with the present invention. FIG. 3 is a perspective illustration of the permanent magnet 11 in relation to the wire 10. FIG. 4 is a view seen from the right in FIG. 3.

The permanent magnet 11, or when applicable the permanent magnets, is/are positioned relative to the wire 10 so that the force lines 20, 21 of the magnetic field extend in planes parallel with the longitudinal extension of the wire. The reference numeral 23 in FIG. 3 identifies force lines that are of no interest in the present context.

Electric current will flow through the wire 10, when an electrical pulse is generated in said wire by the pulse generator. The current gives rise to a magnetic field 22 around the wire. As will be apparent from FIG. 4, the force line 20 of the permanent magnet 11 will counteract the force line 22 around the wire 10, whereas the force line 21 of the permanent magnet will co-act with the force line 22 around said wire. As seen in FIG. 3, that means that the wire will be twisted in mutually opposite directions at the positions shown schematically at A and B respectively, as indicated by the arrows at A and B.

As a result, a mechanical pulse is obtained in the wire in response to torsion in one direction followed by torsion in the opposite direction. The mechanical pulse is thus formed at the position of the permanent magnet 11 and propagates in the wire to the detector including the piezo crystal 19.

The pulse generator functions to send through the wire an electrical pulse that generates around the wire a magnetic field 22 whose strength is of the same order of magnitude as that of the magnetic field 20, 21 generated by said permanent magnet. For example, the pulse has an amperage of 2 amperes and a duration of 2 microseconds.

The permanent magnet may be 4×4×3 millimeters in size.

An embodiment of the detector is shown schematically in FIGS. 5 and 6, of which FIG. 6 is an exploded view. The detector includes a wire guide sleeve 24 made of electrically insulating material. The sleeve 24 includes a channel 25 in which the wire extends.

In one preferred embodiment of the invention, the piezo crystal 19 is flat and provided with an outwardly projecting rod 26. The rod 26 abuts the wire 10 and is held against the wire by means of a rubber body 27, suitably comprised of neoprene rubber. The rod 26 is glued in the piezo crystal and is thus arranged to move in the direction of the arrows 28 as the wire 10 is torsioned.

At that displacement of the rod 26, the rod influences the piezo crystal mechanically, causing said crystal to generate an electrical signal. That signal is delivered to an electronic circuit 31 via conductors 29, 30, as shown in FIG. 5.

The mechanical pulse gives rise, via the piezo crystal, to an electrical signal of the principal appearance shown in FIG. 7, i.e., a sine wave.

The electronic unit 6, 7, 31 is adapted to measure the time from when the pulse generator sends said pulse to when torsion in the wire is registered by the piezo crystal, said time span constituting a measurement of the absolute position of the slide along the graduated rule. Thus, the time span is the mechanical delay time interval of the pulse in the wire 10. The propagation velocity may, for instance, be 1.5 millimeters per microsecond.

The zero crossing of the curve shown in FIG. 7 is preferably detected.

The time span referred to above is dependent on the modulus of elasticity of the wire material. Therefore a calibration must be made in dependence on the wire material. Wire comprised of an iron alloy consisting of 97–98% Fe and the alloying substances Ni, Si, and P has been found to be a suitable material in that connection. The wire will suitably have a diameter of about 0.5 millimeter.

The pulse generator will suitably send a pulse when the operator presses a button 32 on the slide on a measuring occasion. The above-mentioned time span is measured and converted by the electronic unit into the prevailing distance between the legs. That distance is suitably shown on a display 33.

The pulse generator may also be adapted to send pulses continuously at a given pulse repetition frequency, for example at a rate of 10 pulses per second. Measuring of said distance is thereby effected by means of the pulse that is generated immediately after the operator has pressed the button 32.

The slide may include additional buttons 34, 35 for the insertion of data. The pulse generator is adapted to send through the wire an electrical pulse which generates around the wire a magnetic field 22 whose strength is in the same order of magnitude as that of the magnetic field 20,21 generated by the permanent magnet.

It will be obvious that the present invention solves the problems mentioned in the introduction and provides a robust absolute measuring caliper.

Although the invention has been described above with reference to a number of embodiments, it will be understood by the person skilled in this art that the detailed design of the various caliper components can be varied.

The present invention shall not therefore be considered as being limited to said embodiments, since variations can be made within the scope of the accompanying claims.

What is claimed is:

1. A caliper usable to measure tree diameters, said caliper comprising: a graduated rule along which a slide is movable, a first leg attached to one end of said rule and a second leg attached to the slide, wherein measuring of said diameter is effected between said legs, an electronic unit for measuring the position of the slide along the rule and for storing measurement values and other desired data, wherein the graduated rule includes a longitudinally-extending internal cavity and a part of the slide located on the rule includes a permanent magnet; a measuring element including an electrically-conductive wire extending within said cavity and attached at both ends to said rule, which wire co-acts with a piezo crystal adjacent said one end of the rule; wherein the respective ends of said wire are connected electrically to a pulse generator which generates short electrical pulses of predetermined duration; and wherein the caliper includes detector means which co-acts with the piezo crystal to detect a geometric change in the wire, wherein said piezo crystal emits an electrical pulse in response to said geometric change.

2. A caliper according to claim 1, wherein the wire is suspended freely in said cavity; and is under tension.

3. A caliper according to claim 1, wherein said pulse generator sends through the wire an electrical pulse which generates a magnetic field around said wire, said magnetic field having a strength magnitude substantially the same as that of the magnetic field generated by said permanent magnet.

4. A caliper according to claim 1, wherein the permanent magnet is positioned relative to the wire such that force lines of said magnetic field extend in planes substantially parallel to a wire longitudinal axis.

5. A caliper according to claim 1, wherein said piezo crystal is substantially flat and includes an outwardly-projecting rod that is in abutment with the wire; and wherein said rod is positioned relative to the wire to be axially displaceable in response to twisting of the wire about its own axis.

6. A caliper according to claim 1, wherein said detector means measures a time span between a time when the pulse generator sends a pulse to a time when torsioning of the wire is sensed by the piezo crystal; and wherein said time span corresponds with a measurement of an absolute position of the slide along the graduated rule.

* * * * *